United States Patent

DeGarie et al.

(10) Patent No.: US 6,612,079 B2
(45) Date of Patent: *Sep. 2, 2003

(54) CLARIFIER COVER

(76) Inventors: Claude J. DeGarie, 1133 Regent Street, Suite 300, Fredericton, NB (CA), E3B 3Z2; Brent M. Howe, 1133 Regent Street, Suite 300, Fredericton, NB (CA), E3B 3Z2; Brian R. MacLean, 1133 Regent Street, Suite 300, Fredericton, NB (CA), E3B 3Z2

( * ) Notice: Subject to any disclaimer, the term of this patent is extended or adjusted under 35 U.S.C. 154(b) by 0 days.

This patent is subject to a terminal disclaimer.

(21) Appl. No.: 10/120,431

(22) Filed: Apr. 12, 2002

(65) Prior Publication Data

US 2002/0108317 A1 Aug. 15, 2002

Related U.S. Application Data

(63) Continuation-in-part of application No. 09/598,682, filed on Jun. 21, 2000, now Pat. No. 6,389,757.

(51) Int. Cl.[7] .............................. E04H 4/10; E02B 13/00
(52) U.S. Cl. ........................... 52/63; 52/169.7; 52/222; 4/498; 4/503; 4/504; 405/52; 405/129.1
(58) Field of Search ................... 52/63, 169.7, 169.8, 52/86, 23, 222, DIG. 12; 4/498, 500, 502, 503, 504; 242/919; 405/52, 53, 129.1, 129.45, 129.6, 129.75, 129.9, 129.95; 220/220

(56) References Cited

U.S. PATENT DOCUMENTS

| | | | |
|---|---|---|---|
| 2,964,759 A | 12/1960 | Riggs | |
| 3,158,161 A | 11/1964 | Knodel | |
| 3,195,310 A | 7/1965 | Schroeder | |
| 3,313,443 A | * 4/1967 | Dial et al. | 220/219 |
| 3,377,637 A | 4/1968 | Zamorano | |
| 3,461,890 A | 8/1969 | Goodrich | |
| 3,534,412 A | 10/1970 | Crook | |
| 3,903,552 A | 9/1975 | Erlandsson | |
| 4,257,132 A | 3/1981 | Kerby | |
| 4,280,306 A | 7/1981 | Milinic | |
| 4,324,370 A | 4/1982 | Guard | |
| 4,438,863 A | * 3/1984 | Wilson et al. | 220/227 |
| 4,672,691 A | 6/1987 | De Garie | |
| 4,837,990 A | 6/1989 | Peleg | |
| 5,038,517 A | 8/1991 | Talbott | |
| 5,218,743 A | 6/1993 | Miller | |
| 5,791,090 A | 8/1998 | Gitlin | |
| 5,902,082 A | 5/1999 | Kaemper | |
| 6,119,284 A | 9/2000 | Cosman | |
| 6,324,792 B1 | 12/2001 | DeGarie | |
| 6,338,169 B1 | 1/2002 | DeGarie | |
| 6,357,964 B1 | 3/2002 | DeGarie | |
| 6,389,757 B1 | * 5/2002 | DeGarie | 52/63 |

FOREIGN PATENT DOCUMENTS

| | | |
|---|---|---|
| DE | 2938496 | 4/1980 |
| DE | 3512134 | 9/1986 |
| EP | 0985786 | 3/2000 |
| FR | 702293 | 12/1929 |
| FR | 2444763 | 12/1978 |
| FR | 2418318 | 9/1979 |
| FR | 2582227 | 12/1986 |
| FR | 2668195 | 4/1992 |
| GB | 1307520 | 2/1973 |
| GB | 2072649 | 10/1981 |
| NL | 9302022 | 11/1993 |

* cited by examiner

Primary Examiner—Laura A. Callo
(74) Attorney, Agent, or Firm—Mario Theriault

(57) ABSTRACT

In the present invention, there is provided a removable cover for retaining off-gases inside a clarifier. The cover comprises trusses extending across the clarifier and a flexible sheet laid across the trusses. Structural angles enclose the clarifier and constitute a kick plate on the walkways around the clarifier for improving the safety of workers. One side of the flexible sheet is permanently affixed to a first wall of the clarifier. A series of pullers are mounted inside the structural angles for pulling and releasably sealing the three other sides of the flexible sheet against the outmost trusses and against a second wall of the clarifier opposite the first wall. Each puller has a cable-deflector bar extending substantially at a same level as a mounting surface of the puller for increasing an angle of downward pull on the flexible sheet. The flexible sheet is rolled-up along the trusses to expose machinery inside the clarifier.

17 Claims, 13 Drawing Sheets

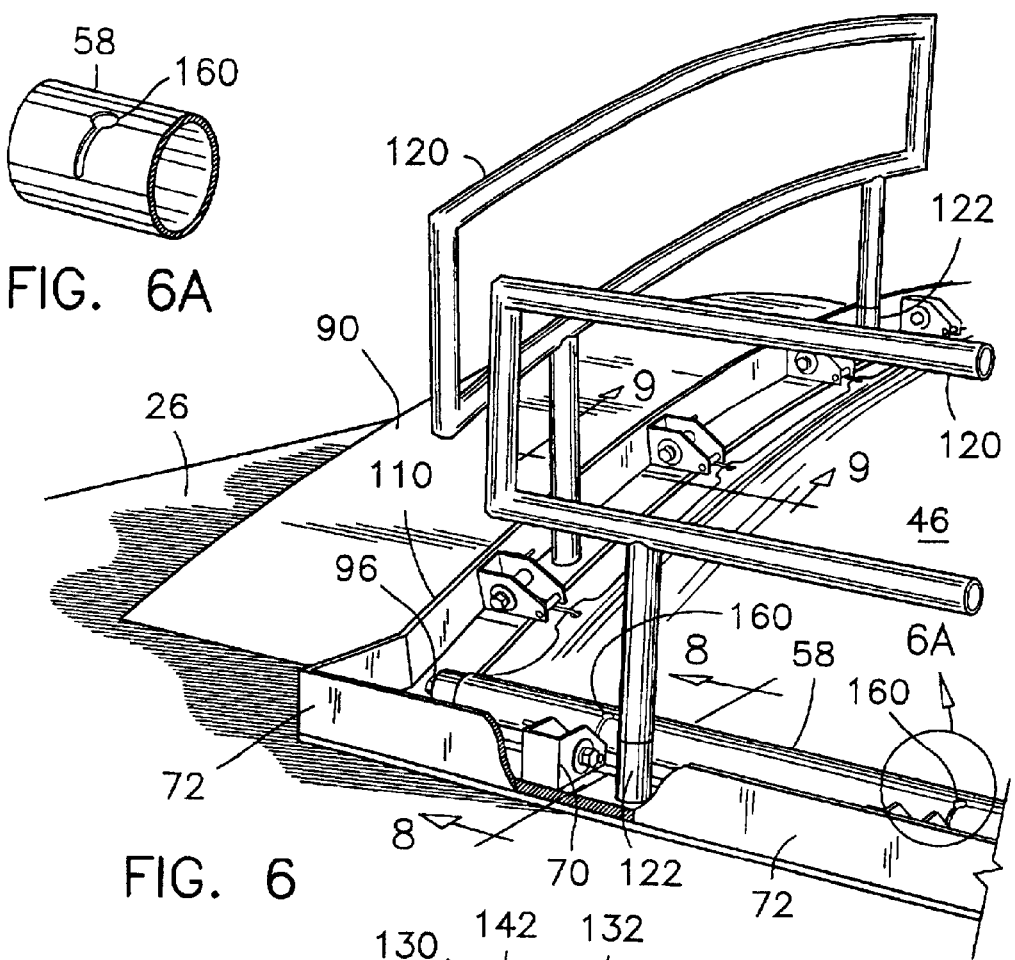
FIG. 6A
FIG. 6
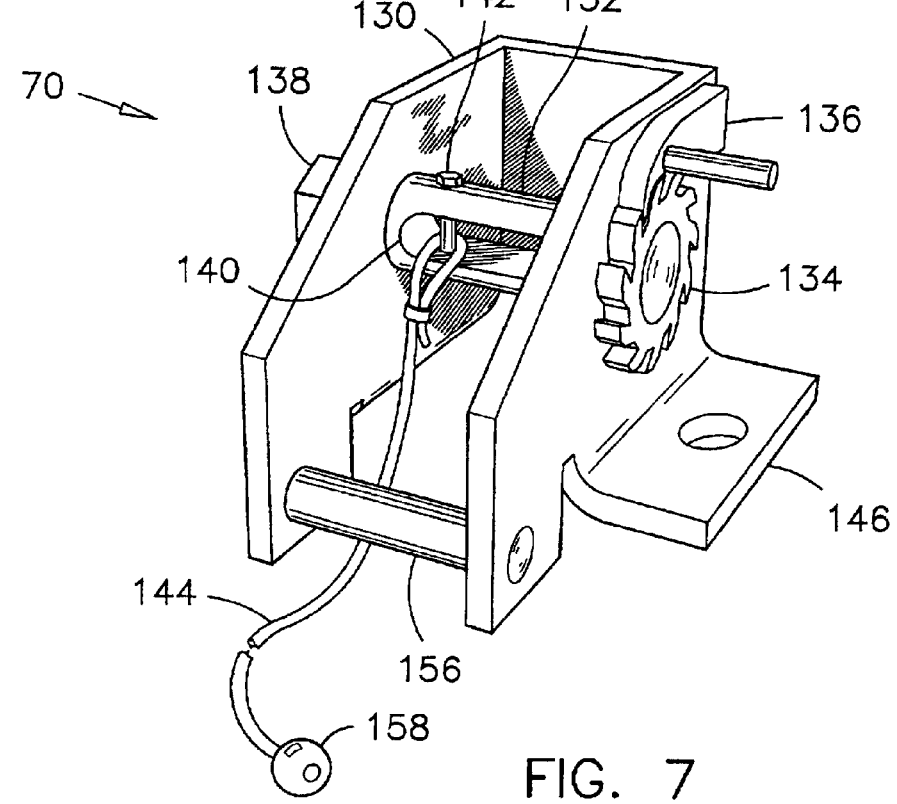
FIG. 7

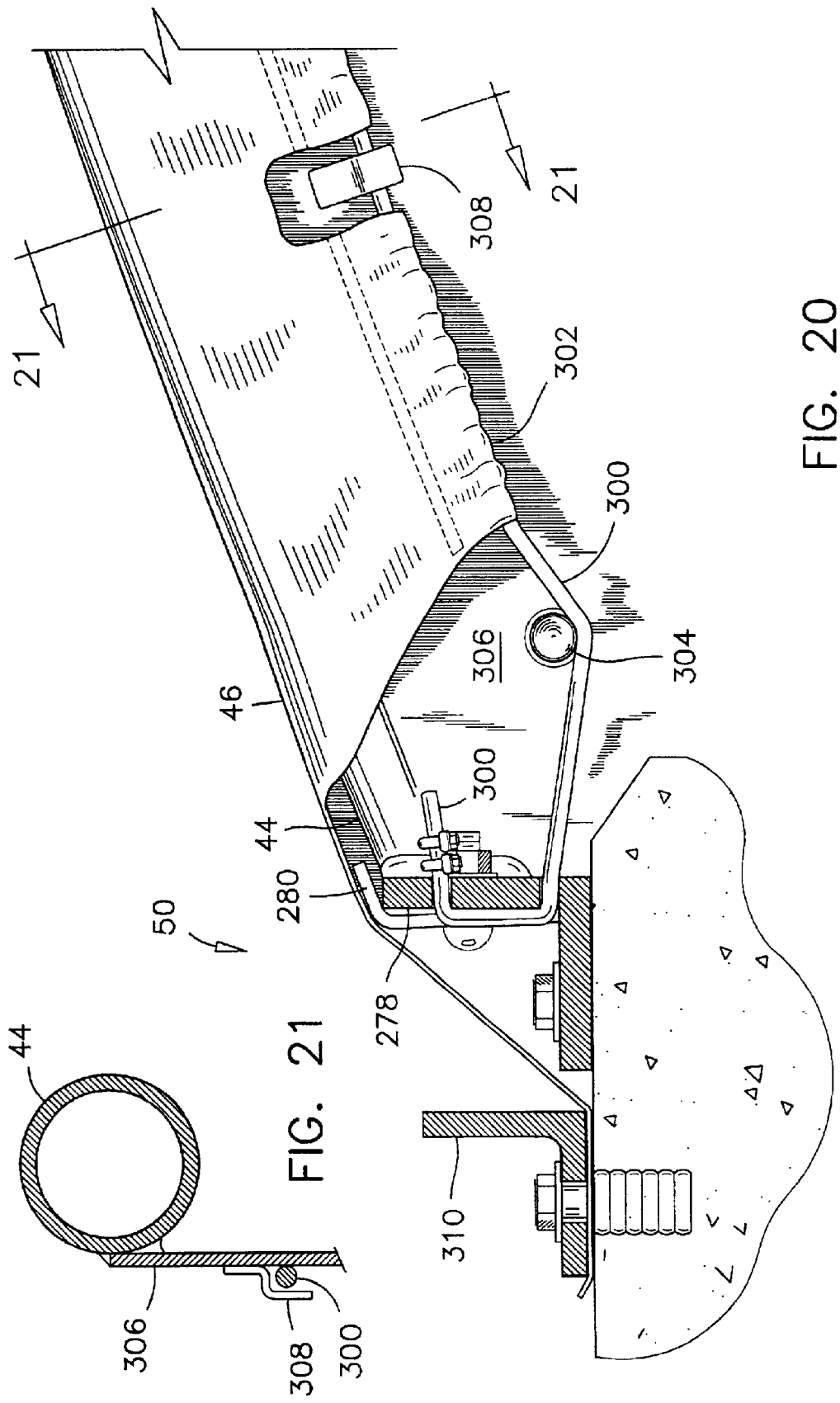

CLARIFIER COVER

This is a continuation-in-part of U.S. patent application Ser. No. 09/598,682 filed on Jun. 21, 2000 now U.S. Pat. No. 6,389,757.

FIELD OF THE INVENTION

This invention pertains to flexible covers for clarifiers, and more particularly, the present invention pertains to the sealing of a flexible cover over a clarifier for maintaining the content of the clarifier in a sealed environment.

BACKGROUND OF THE INVENTION

A typical industrial clarification installation comprises a plurality of reservoirs or holding tanks to be filled with mill effluent. Clarification is normally effected by alternatively agitating and letting the effluent settle, and lifting floating scum from the surface of the effluent or scooping sediments at the bottom of the reservoir. These holding tanks are generally equipped with mechanical equipment that must be accessible for inspection, maintenance or for repair.

The clarification process is often accompanied by a fermenting action and a generation of odorous bio-gases, and/or the release of volatile organic carbons. For environmental reasons, these gases must be collected and treated. Therefore, a clarification reservoir, or clarifier, is preferably covered and sealed to contain the gases. Also, a clarifier preferably has a piping system to transport the gases to a gas treatment plant.

When a removable flexible cover is installed over a clarifier, the installation must resist wind forces that tend to flap portions of the cover and stretch it laterally. Also, the attachment of a flexible cover must be sufficiently strong to permit one or more workers to walk on the flexible cover to fix it if the need arises.

A clarifier having a removable flexible cover mountable thereon must also provide for a certain level of safety when the cover is removed. During maintenance activities for example, it is common to find power tools, welding machines, acetylene torch carts and maintenance wagons along the perimeter of the clarifier. It is therefore important to prevent workers and equipment from sliding into the reservoir.

Examples of various systems available for covering a reservoir are described in the following documents:

U.S. Pat. No. 3,195,310 issued on Jul. 20, 1965 to C. E. Schroeder;

U.S. Pat. No. 4,324,370 issued on Apr. 13, 1982 to W. Guard et al.;

German Patent DE 2,938,496 published on Apr. 24, 1980;

French Patent FR 2,668,195 published in Apr. 24, 1992.

Although the flexible covers of the prior art deserve undeniable merits, it is believed that these systems do not meet all the requirements for a flexible clarifier cover which is securely mountable, removable and safe. It is believed that there continues to be a need for a new removable flexible cover which may be positively sealed, which can support workers walking thereon and which provides for a safe working environment.

SUMMARY OF THE INVENTION

In the present invention, however, there is provided a removable clarifier cover which has safety features incorporated therein, which is particularly efficient for sealing a clarifier in a manner to resist wind stresses and to support workers walking thereon.

In a first aspect of the present invention, there is provided a removable cover for retaining off-gases inside a clarifier having first, second, third and fourth walls. The cover comprises a flexible sheet laid across the clarifier and having first, second, third and fourth margins. There are also provided means for retaining and sealing the first margin to the first wall, and means for pulling and releasably sealing the second, third and fourth margins to the second, third and fourth walls respectively. The means for retaining and sealing the first margin to the first wall comprise a first structural angle extending along the first wall and having a leg member aligned upwardly. The means for pulling and releasably sealing the second, third and fourth margins comprise spaced-apart pullers mounted inside second, third and fourth structural angles extending along the second, third and fourth walls respectively and each structural angle has a leg member aligned upwardly.

In this aspect of the present invention the first, second, third and fourth walls, and the flexible sheet are usable for containing off-gases inside the reservoir and the first, second, third and fourth structural angles constitute kick plates enclosing the clarifier for enhancing the safety of workers working around the clarifier.

In another aspect of the present invention, the clarifier cover comprises a plurality of spaced-apart trusses mounted across the clarifier and the flexible sheet is laid over the spaced-apart trusses. In this aspect of the invention, the flexible sheet is selectively rolled-up over the spaced apart trusses for accessing equipment inside the reservoir.

In accordance with another aspect of the present invention, the means for pulling and releasably sealing the second, third and fourth margins against the second, third and fourth walls respectively also comprise cables affixed to the second, third and fourth margins of the flexible sheet and individually attached to a respective puller. Each of the pullers has a cable deflector bar extending substantially at a same level as a plane of mounting of the puller. These pullers are advantageous for pulling the margins of the flexible sheet against the mounting surface of each puller for facilitating the sealing of the flexible sheet against the second, third and fourth walls.

In accordance with yet another feature of the present invention, there is provided a removable cover for retaining off-gases inside a clarifier having first and second opposite side walls, and a pair of opposite end walls. A plurality of spaced-apart trusses are mounted across the first and second side walls. The trusses comprise first and second outmost trusses each having an arched plated structure attached thereto, and a series of intermediate trusses disposed between the first and second outmost trusses. The flexible sheet is laid over the spaced-apart trusses and the outmost trusses. The flexible sheet has first and second longitudinal margins and first and second transversal edges. The clarifier cover further has means for retaining and sealing the first longitudinal margin to the first side wall; means for pulling and releasably sealing the second longitudinal margin to the second side wall, and means for pulling the flexible sheet across the trusses and for releasably sealing the first and second transversal edges to the first and second outmost trusses respectively. The means for pulling and releasably sealing the second longitudinal margin against the second side wall further comprise a pipe affixed to the second longitudinal margin, a first series of pullers mounted to the second wall and a resilient pad extending under and adjacent the first series of pullers. Each puller has means for pulling the pipe and the second longitudinal margin downward against the resilient pad for sealing the second longitudinal margin against the second side wall.

The means for pulling the flexible sheet across the trusses and for releasably sealing the first and second transversal edges against the first and second outmost trusses respectively comprise grommets along the first and second transversal edges of the flexible sheet. Cables extend through the grommets. Second and third series of pullers are affixed to the first and second outmost trusses respectively. The pullers have means for pulling the cables and the first and second transversal edges against the first and second outmost trusses respectively for sealing these transversal edges against the outmost trusses.

The first, second and third series of pullers have ratchet-type mechanisms that are easily worked for selectively releasing the flexible sheet for opening the clarifier and exposing the equipment inside the clarifier.

Other advantages and novel features of the present invention will become apparent from the following detailed description.

BRIEF DESCRIPTION OF THE DRAWINGS

A preferred embodiment of this invention and several variant elements are illustrated in the accompanying drawings, in which like numerals denote like parts throughout the several views, and in which:

FIG. 6 is a partial perspective view of one corner of the clarifier cover, taken along the openable side thereof;

FIG. 6A is an enlarged partial view of the pipe extending along the openable side of the flexible sheet and illustrating a keyhole-like slot in this pipe, as seen in detail circle 6A in FIG. 6;

FIG. 7 is a front, top and side perspective view of the preferred puller for retaining the clarifier cover in a sealed condition;

FIG. 20 is an end view of the attachment side of a clarifier cover showing additional details of the variant installation shown in FIG. 19;

FIG. 21 is a cross-section view of the outmost truss as seen along line 21—21 in FIG. 20;

DETAILED DESCRIPTION OF THE PREFERRED EMBODIMENT

Figure 1:
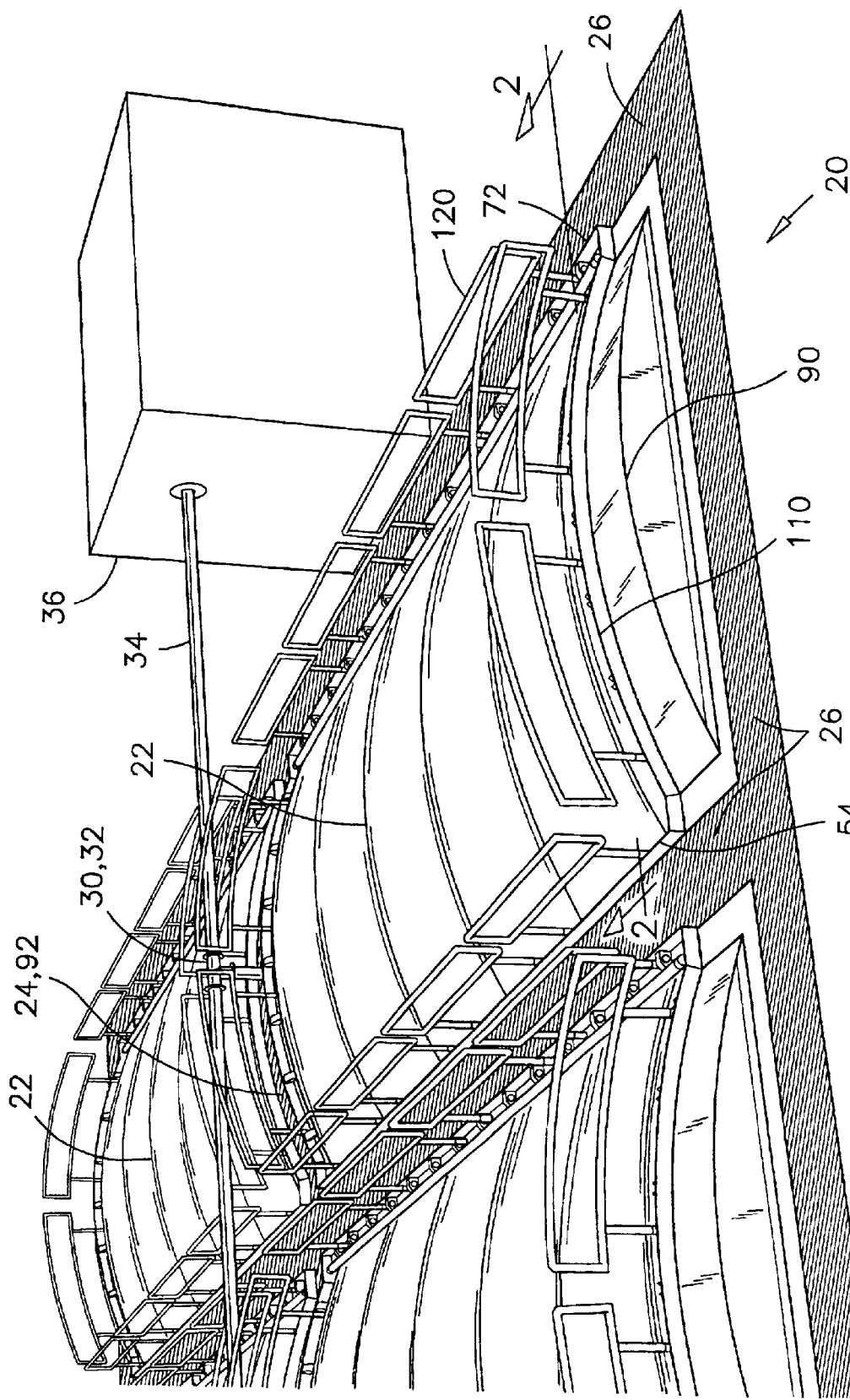
FIG. 1 is a perspective view of a clarification installation showing a clarifier having a pair of covers according to the preferred embodiment of the present invention mounted thereon end-to-end.

While this invention is susceptible of embodiments in many different forms, there is shown in the drawings and will be described in details herein a specific embodiment, with the understanding that the present disclosure is to be considered as an example of the principles of the invention and is not intended to limit the invention to the embodiment illustrated and described. A number of variant elements are also presented herein to illustrate various manners of construction, installation and operation of the present invention as applied to various clarifier configurations.

A clarification installation showing juxtaposed reservoirs 20 each being covered by a pair of clarifier covers 22 according to a preferred embodiment of the present invention is illustrated in FIG. 1. In a typical clarification installation, each reservoir or clarifier 20 is divided in two or more sections by one or more intermediate walkways 24. In a preferred installation, each section is covered by a clarifier cover 22 according to the preferred embodiment of the present invention and is openable individually. Both covers 22 are symmetrical and jointly seal the entire reservoir 20. Peripheral walkways 26 are also provided along the perimeter of each reservoir 20.

In the preferred installation, a suction pipe 30 and valve 32 are connected to the intermediate walkway 24, to draw bio-gases from under the covers 22 and to convey the bio-gases through a main suction pipe 34 leading to a bio-gas treatment plant 36.

Referring now to FIGS. 2–5, the structure of the clarifier cover 22 according to the preferred embodiment is illustrated therein. The reservoir illustrated therein has concrete perimeter walls 40, 42 each having a T-like configuration and forming the peripheral walkways 26.

The clarifier cover 22 comprises a series of trusses 44 that are removably anchored to the opposite side walls 40, 42 of the reservoir. The trusses 44 are made of a single arched aluminum pipe having an outside diameter of between about 1½ inches (38 mm) to 2 inches (50 mm) for installation in clarifiers having a width of about between 14 to 20 feet (4.3 to 6 m). The spacing between adjacent trusses is about 4 to 6 feet (1.2 to 1.8 m).

These trusses 44 are covered by a flexible gas-impermeable fabric sheet 46 which is referred to herein as the flexible sheet. This preferred flexible sheet is a fibre-reinforced nylon-based sheet having stretch resistance properties to resist shrinking or sagging and sufficient tensile strength to support several workers walking thereon between the trusses. The flexible sheet is preferably coated with polyvinyl chloride or polypropylene to resist a variety of toxic fumes and has properties to resist deterioration by ultraviolet sun rays. The preferred flexible sheet is pliable and also has fire retardant properties.

The clarifier cover 22 has an attachment side 50 to which the flexible sheet 46 is permanently affixed and an openable side 52, opposite the attachment side 50. The flexible sheet 46 is affixed to the attachment side 50 for being clamped down to the peripheral walkway 26 under a first structural angle 54 extending along the attachment side 50.

The flexible sheet 46 has a hem 56 along the openable side 52 of the clarifier cover, and an aluminum pipe 58 is mounted inside the hem 56 and extends the full length of the clarifier cover 22. The pipe 58 has an outside diameter of about 2–3 inches (51–76 mm).

There is provided along the openable side 52, an elongated resilient pad 60 made of a resilient material such as soft rubber for example. A series of pullers 70 is installed along the openable side 52, inside a second structural angle 72 attached to the openable side, for pulling the pipe 58 against the resilient pad 60 and for efficiently sealing the flexible sheet 46 to the openable side 52.

Each truss 44 has right-angled brackets 80, one at each end thereof. Each angle bracket 80 has a slot 82 in its lower vertical segment and one or more holes 84 in its upper horizontal segment. In the preferred installation, the rim wall 86 of each reservoir 20 has protruding anchor bolts 88 which coincide in size and locations with the placement of the trusses 44, such that each truss is attachable to, or removable from a respective anchor bolt 88, by working the bolt and by lifting the truss 44 out of the bolt 88.

The takeoff pipe 30 is preferably connected to the upper portion of the walkway 24. A valve 32 is also preferably mounted on the take off pipe 30 to isolate one reservoir 20 from the main suction pipe 34, for doing inspection, maintenance or repair work on that reservoir without affecting the operation of other reservoirs in a same clarification installation.

Referring back to FIG. 1, the outmost truss of a clarifier cover 22 is enclosed on one side thereof by an arched plated structure 90 extending to and sealed against the peripheral walkway 26. The opposite outmost truss is mounted to the arched plated structure 92 between two clarifier covers and constitutes, with the arched plated structure 92, the intermediate walkway 24. The arched plated structures 90, 92 may have one or more louvers or portholes therein (not shown) to admit air under the clarifier cover 22, or to allow visual inspection of the reservoir.

Figure 2:
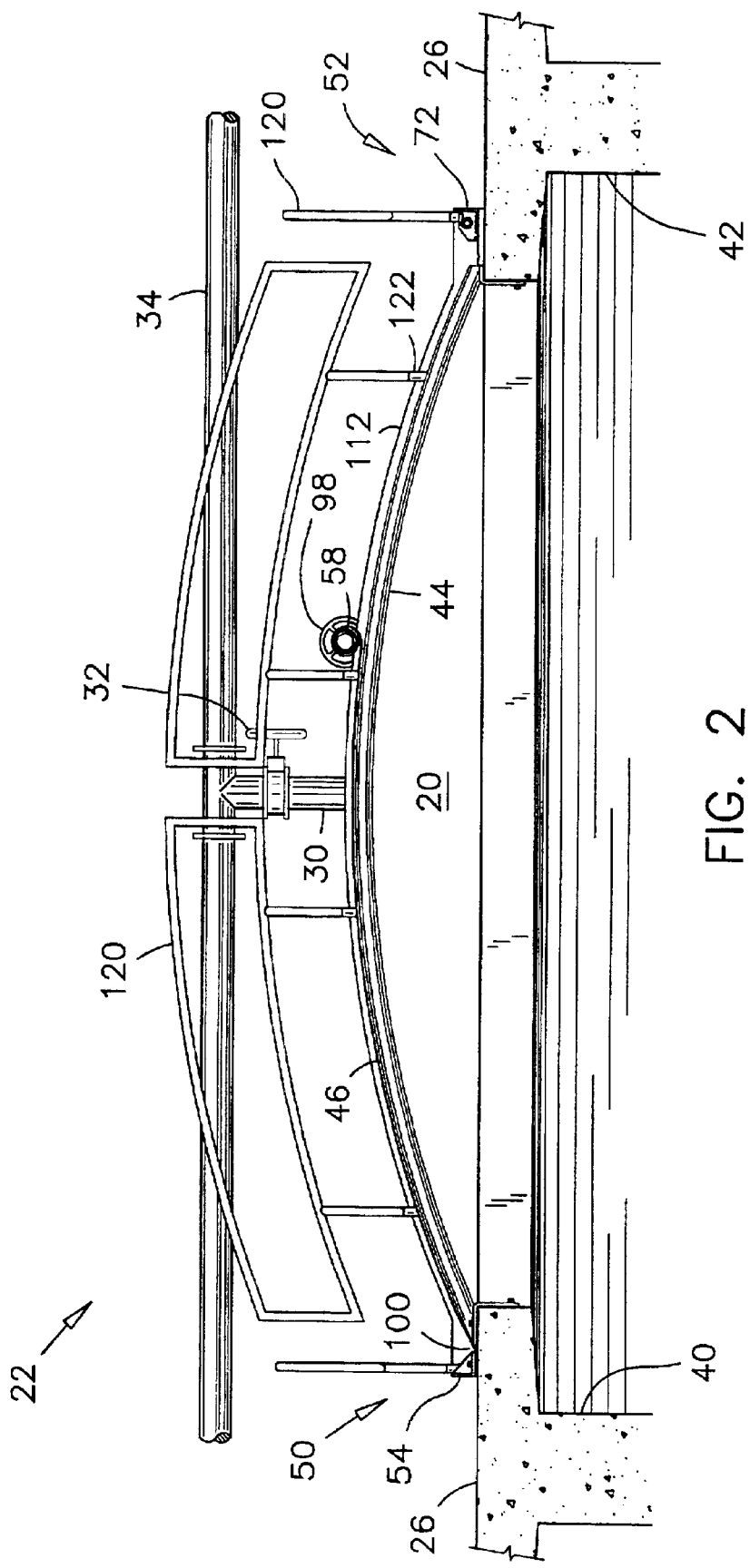
FIG. 2 is a cross-section view of the clarifier illustrated in FIG. 1 as seen along line 2—2 in FIG. 1.
Figure 3:
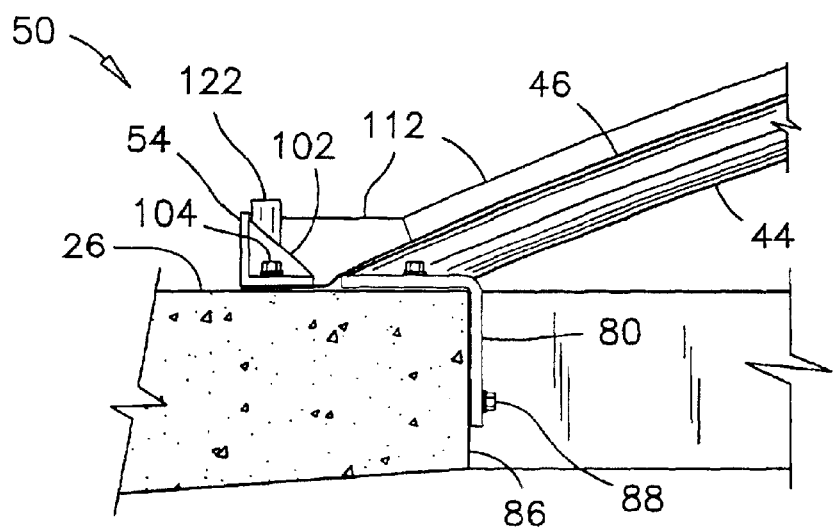
FIG. 3 is an enlarged partial view of the attachment side of the clarifier cover taken from the left side of the cross-section view in FIG. 2.
Figure 4:
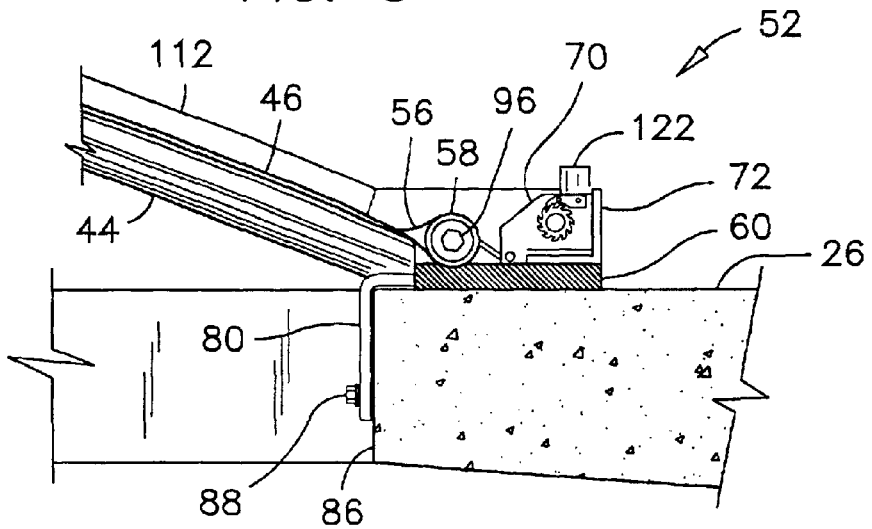
FIG. 4 is an enlarged partial view of the openable side of the clarifier cover taken from the right side of the cross-section view in FIG. 2.
Figure 5:
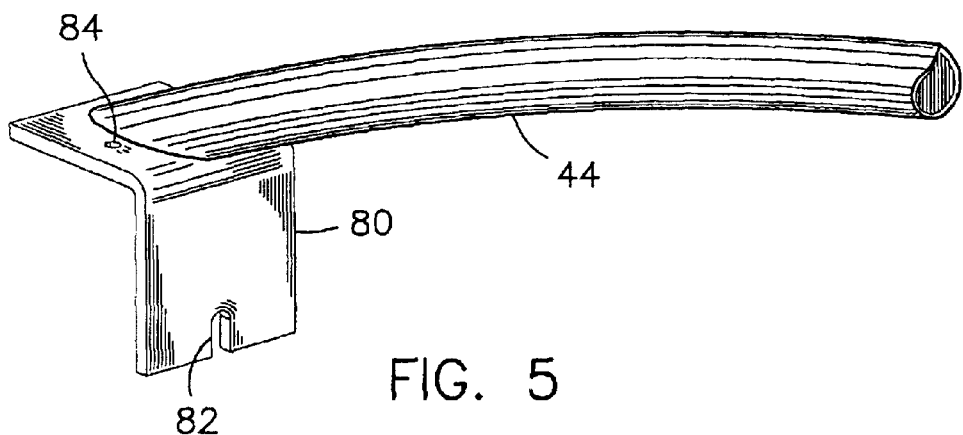
FIG. 5 is a partial perspective view of a preferred truss member supporting the flexible sheet over a clarifier.

Referring back to FIG. 2 the clarifier cover is openable by rolling the flexible sheet 46 onto the pipe 58 and along the trusses 44 as illustrated. The preferred pipe 58 has a square or hexagonal boss 96 at each end. One of these bosses 96 is partly illustrated in FIGS. 4 and 6. A socket wrench, a hand wheel 98 or similar tool may be mounted to these bosses 96 for facilitating the winding of the flexible sheet onto the pipe 58. When a pair of hand wheels 98 are used, one of which is shown in FIG. 2, two workers, one standing on an intermediate walkway 24 and the other one standing on the arched plated structure 90 for example, can roll up the flexible sheet 46 with ease.

An elongated tray 100 is defined by the first structural angle 54 for receiving and holding the flexible sheet 46 in a rolled-up form. A series of gussets 102 are welded inside this first structural angle 54 for forming a cradle for retaining the rolled-up flexible sheet above the anchor bolts 104.

When inspection or repair work needs to be done inside the reservoir 20, the flexible sheet 46 is easily removed as described and illustrated, and a number of trusses 44 may be removed and stacked side by side at one end of the reservoir 20 for example, thereby providing unobstructed access to the equipment inside the reservoir.

Referring now to FIG. 6, there is illustrated therein one corner of the clarifier cover 22 according to the preferred embodiment. An important feature of the clarifier cover according to the preferred embodiment is that there are provided kick plates enclosing each cover. The kick plates are made of the first and second structural angles 54 and 72 and two arched structural angles 110, 112 mounted over the arched plated structures 90 and 92 respectively. As illustrated, the structural angles are installed with one leg member extending upwardly and the other leg member, referred to hereinafter as the sole portion, laid against the surface of the walkways 26 or the plated structures 90, 92. The height of the kick plates, or the dimension of the uprising leg member, is preferably at least about four inches (10 cm).

The kick plates, or structural angles 54, 72, 110 and 112 are advantageous for preventing a worker from slipping and falling into the reservoir, or dropping a power tool or maintenance equipment in the reservoir when effecting maintenance work around the reservoir.

For further increasing the safety of workers working around the clarifier, there are provided handrails 120 mounted along the clarifier cover. These handrails 120 are mounted into a series of sockets 122 affixed to the structural angles. The handrails 120 are removable from the sockets for doing maintenance work inside the clarifier.

Another important aspect of the clarifier cover according to the preferred embodiment is the use of pullers 70 for sealing the flexible sheet 46 to the outmost trusses 44 and to the openable side 52 of the clarifier cover. The preferred puller 70 has a frame 130, a main shaft 132 mounted inside the frame 130. A ratchet wheel 134 is affixed to the main shaft 132 outside the frame. A pawl 136 is also mounted to the outside of the frame 130 and interferes with the movement of the ratchet wheel 134 for maintaining a tension on a cable wound around the main shaft 132. The main shaft 132 also has a square or hexagonal stem 138 protruding outside the frame 130 on the opposite side of the frame relative to the ratchet wheel 134 and the pawl 136. The square or hexagonal stem 138 has dimensions for engagement with a socket wrench for rotation by a socket wrench.

The main shaft 132 also has a slot 140 there along and a pin 142 extending across the slot for retaining a cable 144 to the shaft.

Figure 8:
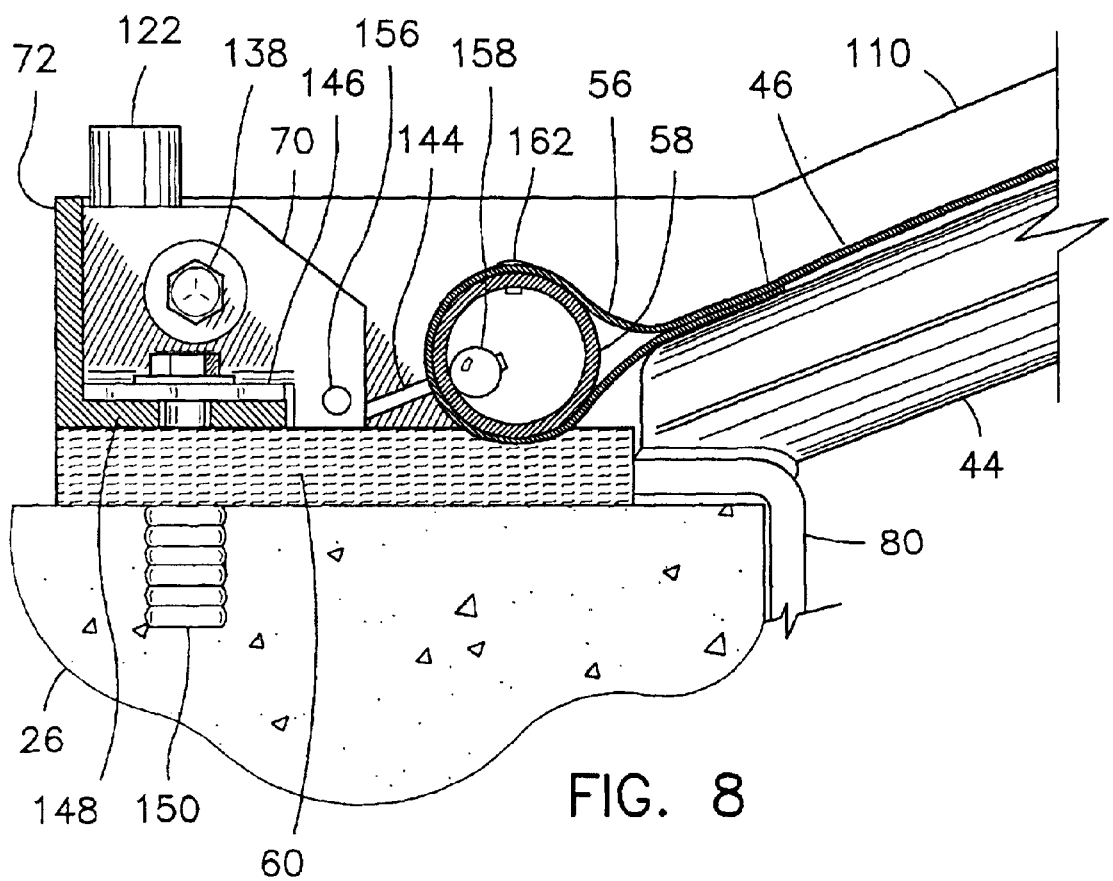
FIG. 8 is an enlarged partial cross-section view of the openable side of the clarifier cover as seen along line 8—8 in FIG. 6.
Figure 9:
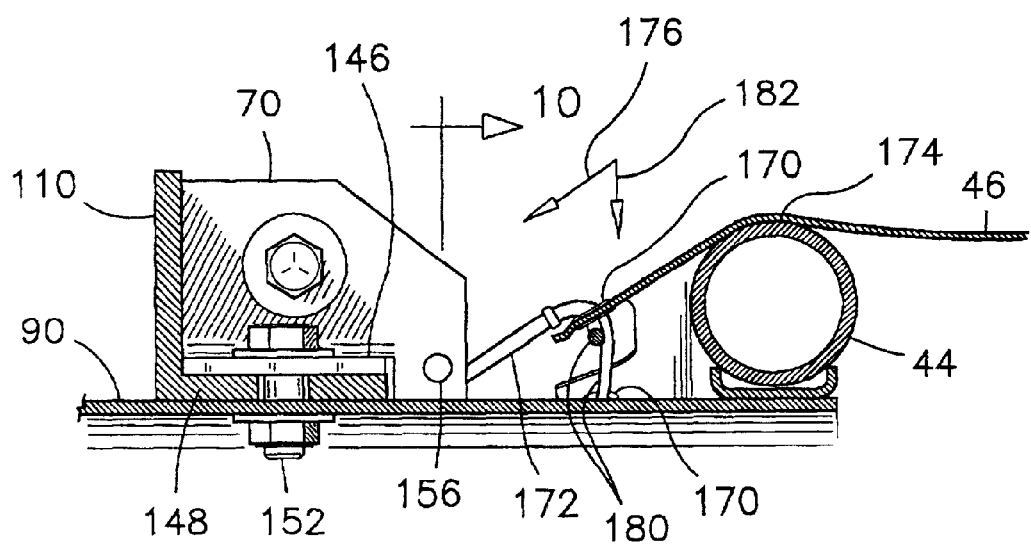
FIG. 9 is an enlarged partial cross-section view along an edge of the clarifier cover, showing a first preferred sealing arrangement of the flexible sheet over the outmost truss of the clarifier cover, as seen along line 9—9 in FIG. 6.

The preferred puller 70 also has a pair of flanges 146, for attachment to the sole portion 148 of one of the structural angles 72, 110, 112, as illustrated in FIGS. 8 and 9 in particular. The pullers 70 which are mounted along the openable side 52 of the cover are preferably held by anchor bolts 150 extending through the flanges 146, through the sole portion 148 and through the resilient pad 60, for holding the pad 60 down against the surface of the walkway 26. When the puller 70 is mounted to the arched plated structure 90 or 92, the puller 70 is retained to the arched plated structure by means of machine bolts 152 extending through the flanges 146, through the sole portion 148 of the structural angle 110 or 112, and through the arched plate structure 90 or 92.

The preferred puller 70 also has a deflector bar 156 mounted to the frame, below the flanges 146. The deflector bar 156 is particularly advantageous for changing the direction of force of the puller for pulling the flexible sheet downward as illustrated and described hereinafter, to better seal the clarifier cover 22.

The sealing of the clarifier cover 22 along the openable side 52 is effected by pulling the pipe 58 downward against the resilient pad 60. This is effected using several pullers mounted along the structural angle 72, each having a cable 144 and a knob 158 crimped on the end of that cable 144. The knobs 158 are inserted into keyhole-like slots 160 which are illustrated in FIGS. 6 and 6A.

The cables 144 are pulled from under the deflector bars 156 and into the pullers 70, for pulling the pipe 58 downward against the resilient pad 60 and for pulling the longitudinal margin of the flexible sheet 46 along the trusses 44 and across the reservoir. The pipe 58 is preferably held to the hem 56 by means of a plurality of fasteners 162 extending through the longitudinal margin of the flexible sheet and through the wall of the pipe 58. The preferred spacing between the pullers 70 along the openable side 52 is between 24 inches and 72 inches (0.6 to 1.8 m) for common clarifier installations.

The releasing of the pullers 70 for opening the clarifier cover is done by working the hexagon stem 138 and the pawl 136 as is customary with common ratchet-type winches.

Figure 10:
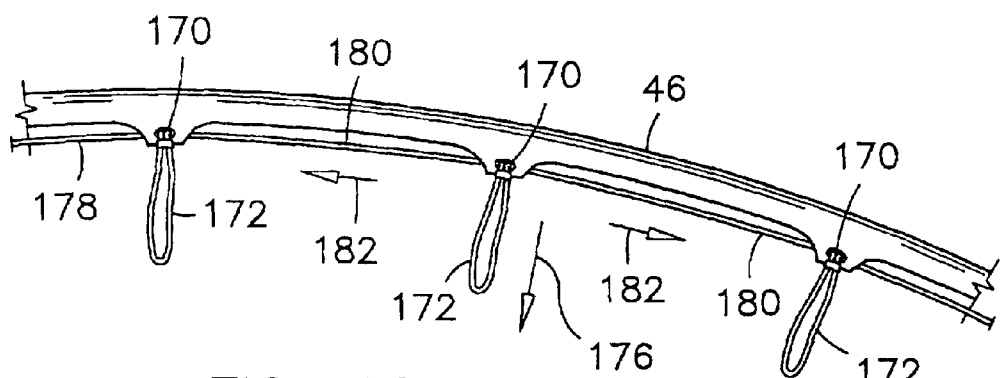
FIG. 10 is a schematic illustration of a first preferred sealing arrangement, as seen generally along line 10 in FIG. 9, for sealing the transversal edge of the cover.

The sealing of the clarifier cover 22 along both outmost trusses 44 is effected with another series of pullers 70 spaced apart along the arched structural angles 110 and 112 as illustrated in FIGS. 6 and 9. The flexible sheet 46 has grommets 170 along each transversal edge thereof and a cable loop 172 extending through each grommet. The locations of the grommets 170 correspond to the locations of the pullers 70 along the structural angles 110, 112. Each cable loop 172 is engaged under the deflector bar 156 and into the main shaft 132 of each puller 70. As illustrated in FIG. 9, the deflector bar 156 is generally closer to the mounting structure 90 as is the upper segment 174 of each truss 44. Hence, the edge of the flexible sheet 46 is pulled downward by each cable loop 172, as indicated by arrow 176 in FIGS. 9 and 10. In the first preferred arrangement, the cable loops 172 are parts of a continuous cable 178 extending along the transversal edge of the flexible sheet 46 and through all grommets 170. The cable 178 has straight segments 180 extending between adjacent loops 172. Therefore, when one loop 172 is pulled into a puller 70, the tension of the cable is applied to the respective grommet 170 in a downward direction 176 as indicated previously, and also in a circumferential direction as indicated by arrows 182.

These compound forces 176, 182 are advantageous for pulling the flexible sheet 46 against the trusses 44 and for preventing the flexible sheet from slipping across the trusses 44 in conditions of strong wind for example, or when one or more workers walk over the flexible sheet for any reason. The circumferential tension 182 of the cable 178 causes the arc defined by the straight segments 180 to have a smaller radius than the radius of the upper segment 174 of the outmost truss 44. This feature is advantageous for preventing the slipping of the flexible sheet across and over the outmost truss 44 in a variety of stress conditions.

Figure 11:
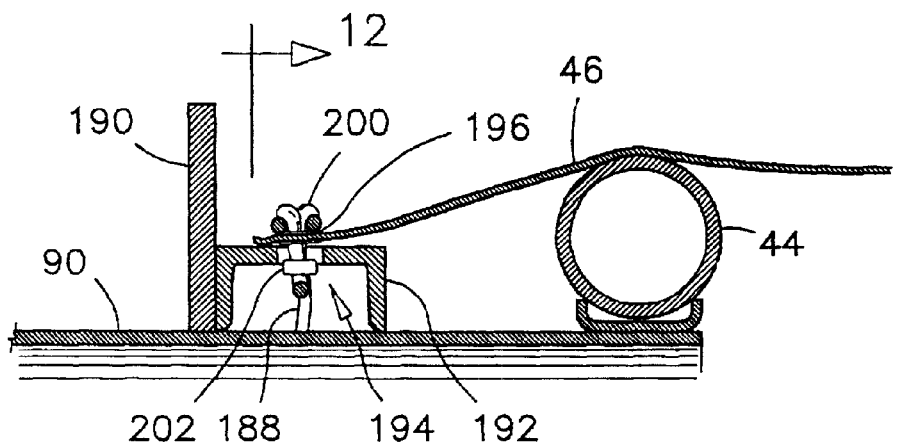
FIG. 11 is an enlarged partial cross-section view along an edge of the clarifier cover, showing a second preferred sealing arrangement of the flexible sheet over the outmost truss of the clarifier cover, as seen along a similar location as for the view defined by line 9—9 in FIG. 6.
Figure 12:
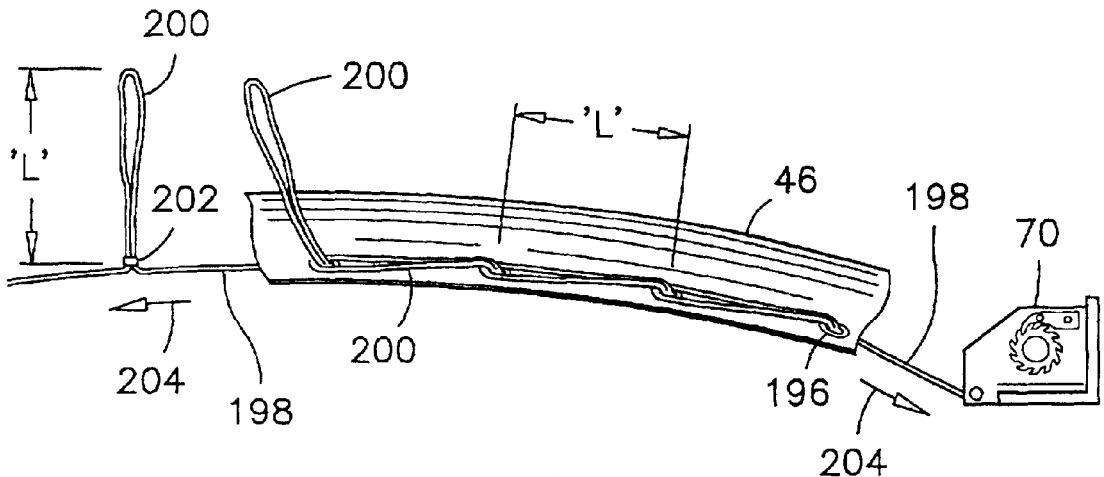
FIG. 12 is a schematic illustration of the second preferred sealing arrangement, as seen generally along line 12 in FIG. 11.

Referring now to FIGS. 11 and 12, there is illustrated therein a second preferred arrangement for sealing the edges of the flexible sheet 46 against the outmost truss 44. In this second preferred arrangement, the kick plate along the arched plated structures 90 or 92 is made of a curved flat bar 190 affixed to a curved structural channel 192, the flanges of which face downward. The web portion of the channel 192 has a series of slots 194 therein, the locations and spacing of which correspond to the locations and spacing of the grommets 196 along the transversal edge of the flexible sheet 46. The flexible sheet is lashed to the channel 192 by means of a cable 198 extending inside the channel and through the slots 194 and grommets 196.

The preferred cable 198 has a series of preformed loops 200 there along. Each loop 200 is defined by a clip 202. The length 'L' of each loop 200 is a same as a spacing 'L' between two adjacent grommets 196. This characteristic is advantageous for lashing the transversal edge of the flexible sheet to the channel 192 by inserting each loop through a grommet and into an adjacent loop, as illustrated in FIG. 12. In this second preferred installation, both ends of the cable 198 are attached to a respective puller 70 one of which is shown in FIG. 12. Upon tightening of the puller 70, the cable 198 is stretched around the circumference of the arched plated structure 90 or 92 as illustrated by arrows 204 to further seal the transversal edge of the flexible sheet against the outmost truss 44.

While a rectangular clarifier cover has been illustrated and described, it will be appreciated that the principles and structural arrangements of the present invention are not limited to rectangular clarifiers, but are also applicable to clarifiers having circular or polygonal perimeters.

Figure 13:
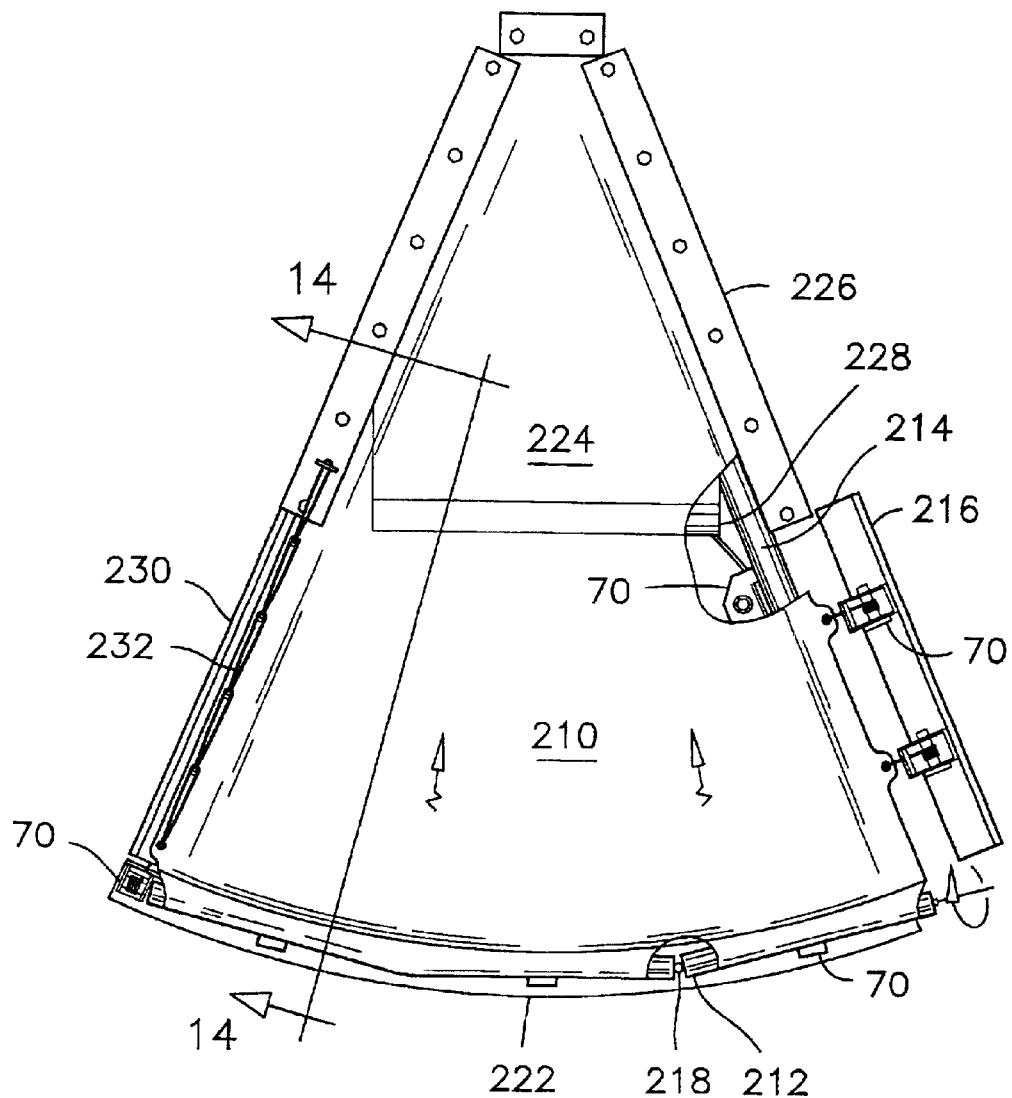
FIG. 13 is a plan view of a triangular cover segment for covering an opening in a circular clarifier.
Figure 14:
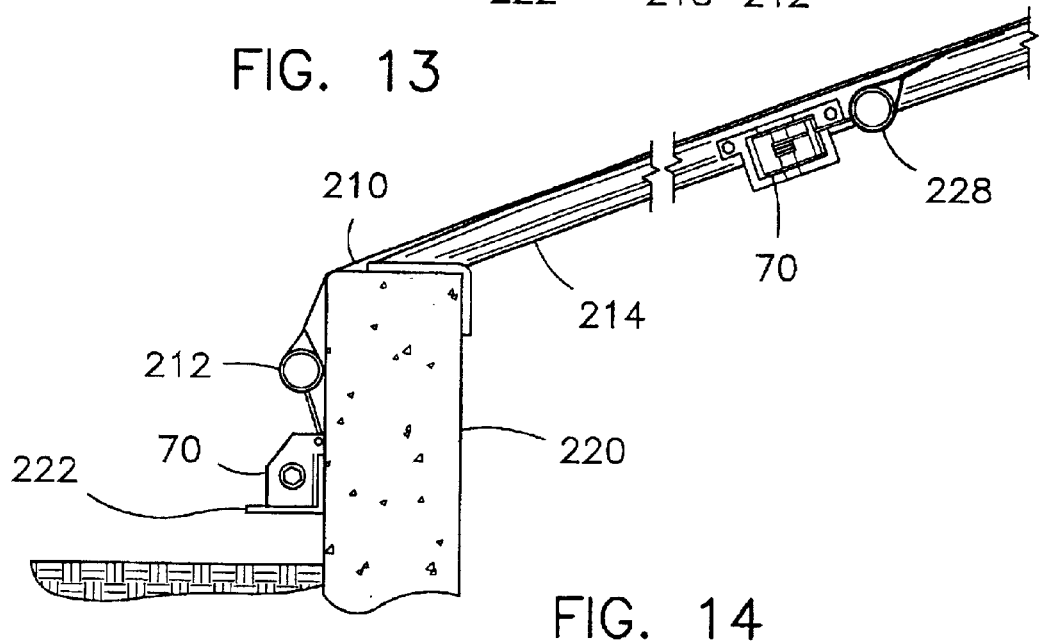
FIG. 14 is a cross-section view of the triangular segment, as seen along line 14—14 in FIG. 13.

For example, FIGS. 13 and 14 illustrate partial details of a triangular cover segment 210 for covering an opening in a circular clarifier. The cover segment 210 consists of a flexible gas-impermeable fabric sheet with grommets along the sides thereof. The circular clarifier of interest herein has a rigid cover with one or more triangular openings, through which inspection and repair work inside the clarifier is carried out. The circular clarifier structure is not illustrated in details herein for being apparent from the previous disclosure. In this circular clarifier, each triangular opening is cover-able by a cover segment 210, and is openable by rolling the cover segment 210 on a flexible pipe 212, in a similar manner as previously described for the rectangular clarifier. The cover is openable entirely as previously described for the rectangular clarifier, or partly as illustrated herein with portions of the cover segment 210 being securely affixed to the clarifier structure.

The cover segment 210 is partly of entirely held against the frame 214 of the clarifier by several pullers 70 mounted inside structural angles 216 also as previously described and aligned along one or both sides of the triangular opening. The angles 216 are attached to the rigid portions of the clarifier cover (not shown), and constitute kick plates along both sides of the triangular opening.

In this particular installation, the flexible pipe 212 is preferably made of several straight sections linked to each other by flexible torque transmitting joints 218. The flexible pipe 212 is thereby workable between a straight mode for rolling the cover segment thereon, and a curved mode to better seal the cover segment 210 against a circular clarifier wall 220. Although the preferred flexible pipe 212 is illustrated herein with joints 218, it will be appreciated that it may be made of a single section of flexible plastic material for example.

Another series of pullers 70 is mounted to the outside surface of the clarifier wall 220 and is used to retain the flexible pipe 212 and the cover segment 210 in a closed mode. The structural angle 222 retaining the pullers 70 to the clarifier wall constitutes a guard rail for preventing damage to the cover segment 210 and to the flexible pipe 212 by equipment such as lawn mowers moving near the clarifier wall.

When the triangular cover segment is partly openable, the fixed portion 224 is permanently anchored to the clarifier structure by means of clamp bars 226 for example along both sides thereof. An intermediary tubular bar 228 is preferably affixed to the fixed portion 224 and held tight by two pullers 70 mounted to the clarifier structure 214.

For convenience, the triangular cover 210 segment may also be retained to a channel and flat bar structure 230, such as described herein as the second preferred arrangement and illustrated in FIGS. 11 and 12. In this case, the edge of the triangular segment is affixed to the channel and flat bar structure 230 by a lashed rope 232 as previously described and illustrated.

Figure 15:
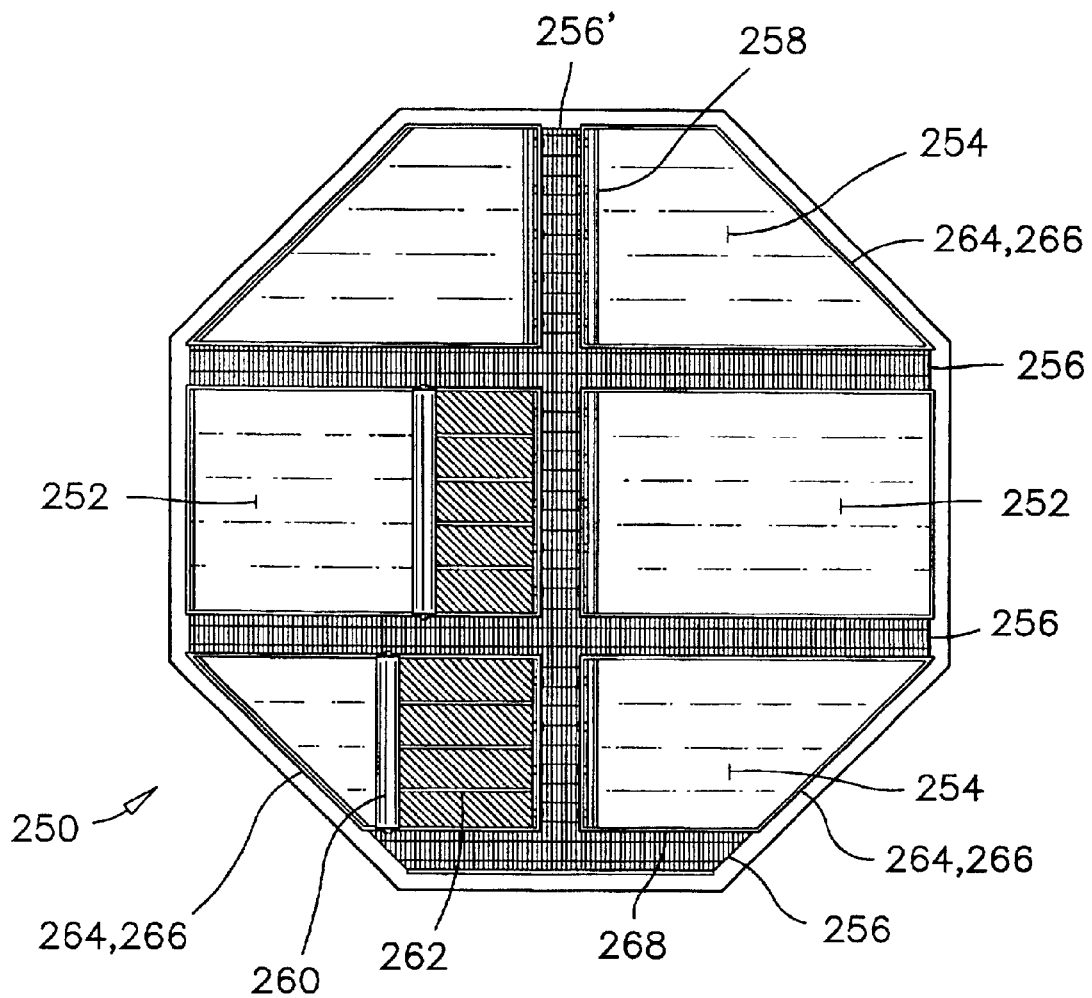
FIG. 15 is a plan view of a non-rectangular clarifier covered by a plurality of clarifier covers according to the present invention.
Figure 16:
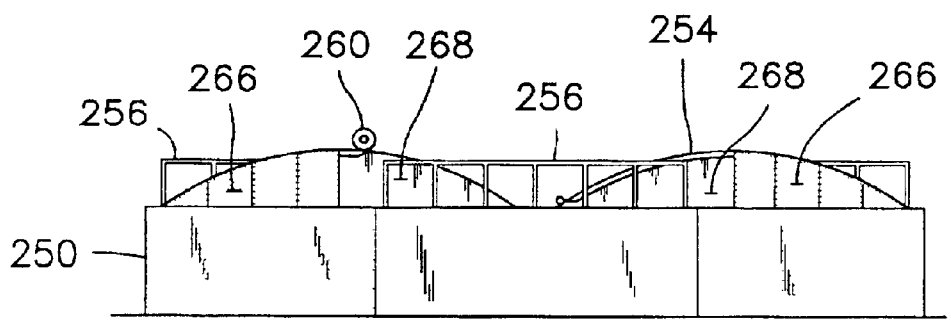
FIG. 16 is an elevation view of the non-rectangular clarifier shown in FIG. 15.

Another example of a clarifier having a non-rectangular shape is presented in FIGS. 15 and 16. In this arrangement, the clarifier 250 has a octagonal shape and is covered by two rectangular covers 252 and four trapezoidal covers 254 separated by walkways 256, one of which 256' extends generally along a diameter of the clarifier. Each of the covers 252, 254 has an openable side adjoining the diametrical walkway 256'. Each of the covers 252, 254 is opened by rolling the flexible sheet 260 toward the outside of the clarifier in a same manner as previously described. Similarly, the edges of the flexible sheets are sealed along the attachment sides and against the upper segments of the outmost trusses of each cover in a similar manner as previously described.

It should be noted that the trusses 262 of the trapezoidal covers 254 have a same profile but different lengths. Each of these trusses 262 has a low end along the diametrical walkway 256' and a high end along one of the outside walls 264 of the clarifier. The high ends of these trusses define a series of juxtaposed vertical trapezoidal planes which are covered and sealed by end plates 266. Each of the outmost trusses is also covered and sealed by end plates 268.

The openable side 52 of each cover is sealed against the diametrical walkway 256' using the resilient pad 60 and pullers 70 as previously described, or using alternate pullers as will be described hereinafter.

Figure 17:
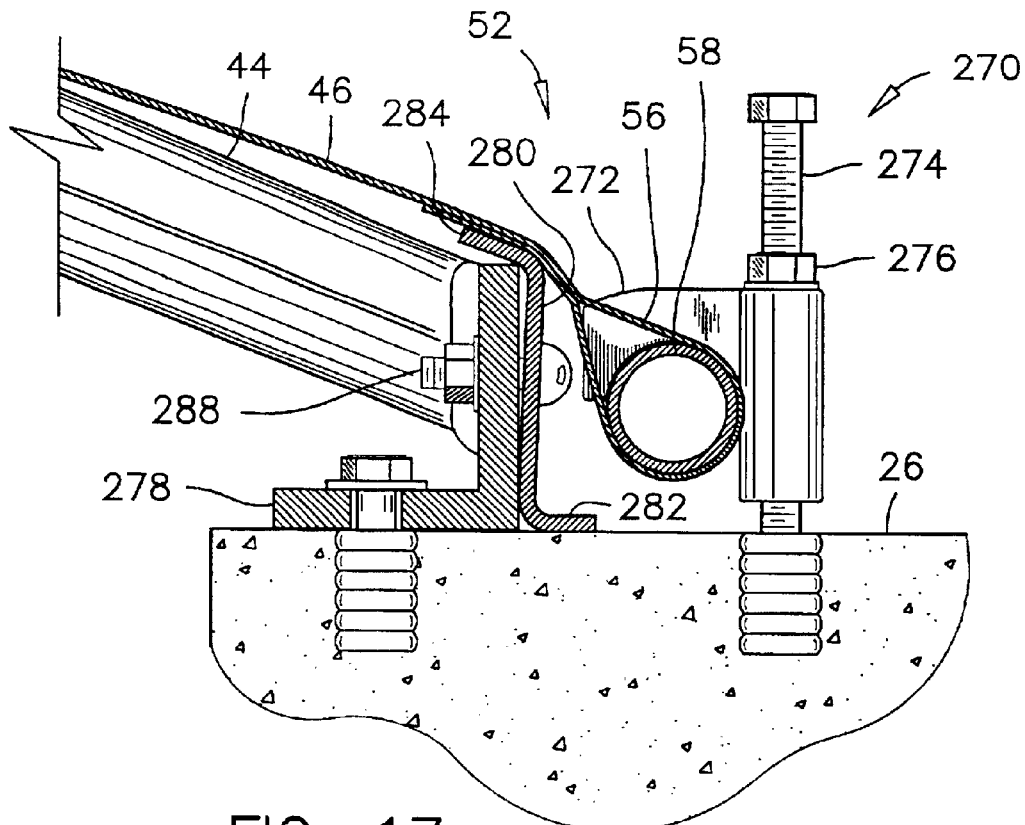
FIG. 17 is a cross-section view of the openable side of a clarifier cover showing a variant puller mounted along the openable side.

It will be appreciated that the pullers 70 as illustrated in the preferred embodiment of the present invention are advantageous but not essential to the proper operation of the cover. The illustration in FIG. 17 presents an alternate puller arrangement 270 which is also effective in sealing the flexible sheet 46 to the peripheral walkway 26. In this alternate puller arrangement 270, a hook member 272 is mounted on a threaded stem 274 anchored to the walkway 26. The hook member 272 is adjustable vertically along the threaded stem 274 by means of a nut 276 and washer. The hook member 272 engages with the aluminum pipe 58 through an opening (not shown) in the hem 56. The nut 276 is tightened to pull the hook member 276 and the aluminum pipe 58 downward to seal the flexible sheet 46 against the structural angle 278.

When the structural angle 278 consists several short segments each anchoring a single truss 44, a continuous S-shaped sealing plate 280 is preferably attached to the structural angle segments and made to extend along the entire length of the openable side 52 This S-shaped sealing plate 280 has a lower curved lip 282 sealed against the surface of the walkway 26, and an upper curved lip 284 covering the upper edges of the structural angle segments 278. This upper curved lip 284 constitutes the sealing edge against which the openable margin of the flexible sheet 46 is pulled tight by the hook members 272.

Figure 18:
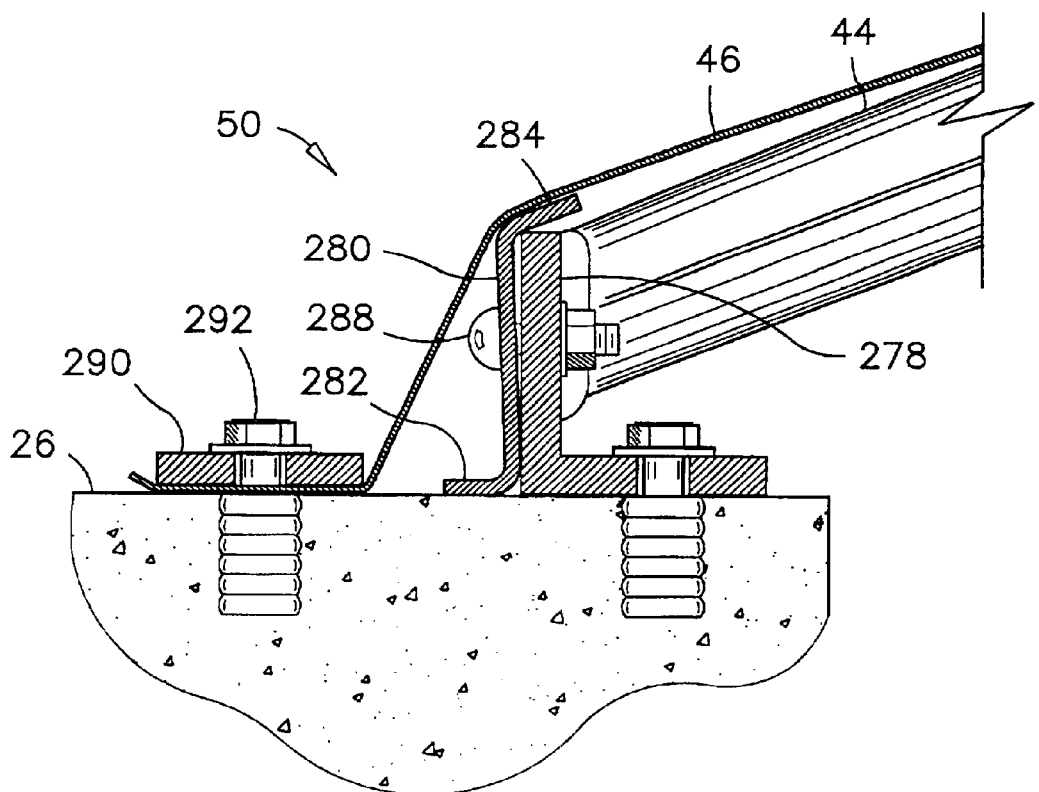
FIG. 18 is a cross-section view of the attachment side of a clarifier cover showing a variant arrangement for sealing the attachment side of the flexible sheet to the peripheral walkway.

When the structural angle 278 consists several short segments each anchoring a single truss 44, another continuous S-shaped sealing plate 280 is also used along the attachment side 50 of the cover as illustrated in FIG. 18. The sealing plate 280 is attached to the structural angle segments 278 by bolts 288. In this arrangement, the attachment margin of the flexible sheet 46 is affixed to the walkway 26 under a clamp bar 290 bolted to the walkway by anchor bolts 292. These S-shaped sealing plates 280 constitute kick plates along both sides of the clarifier for enhancing the security of workers around the clarifier.

Figure 19:
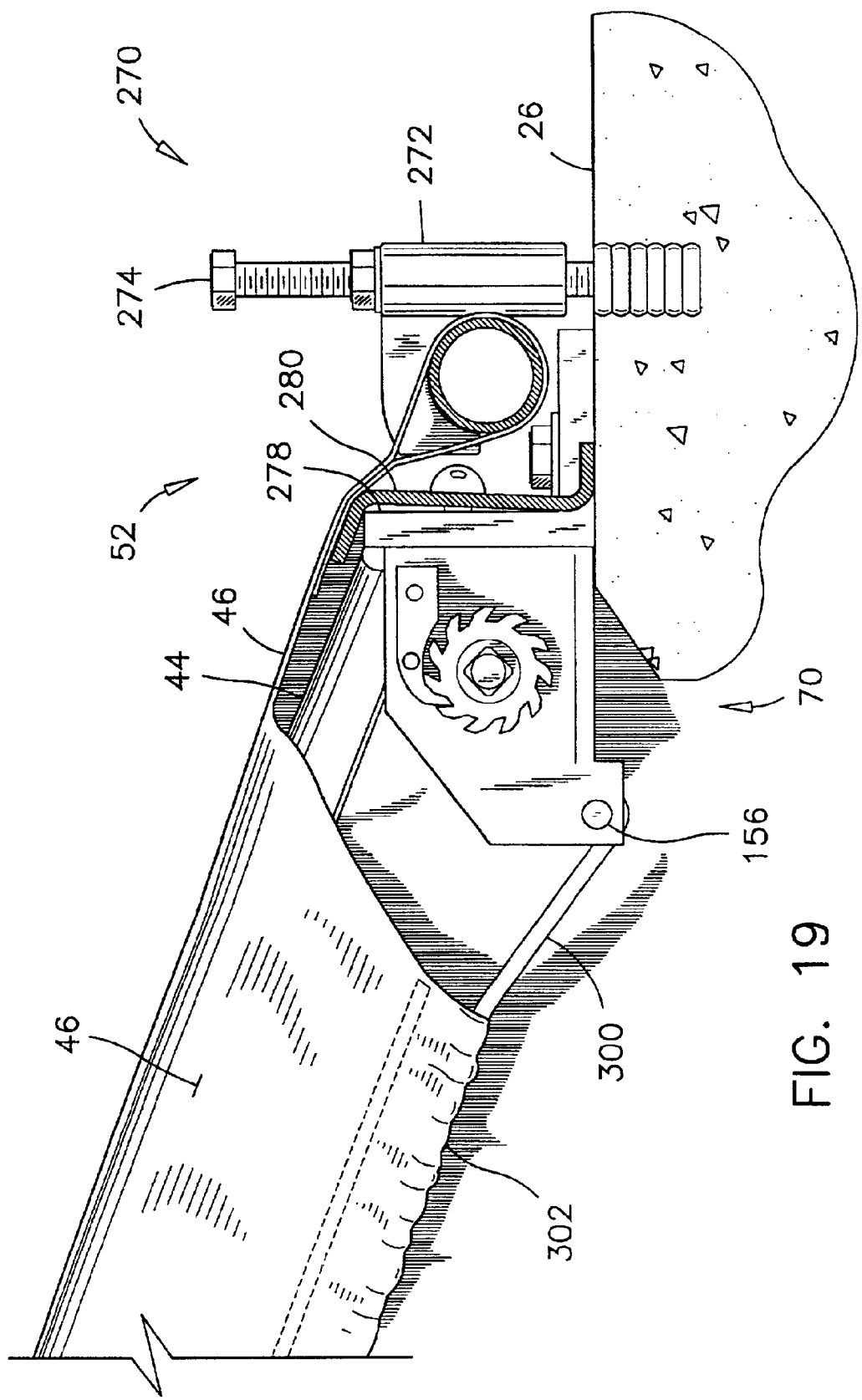
FIG. 19 is an end view of the openable side of a clarifier cover showing a variant installation for stretching and sealing the flexible sheet along one of the outmost trusses.

Referring now to FIGS. 19–21 a variant installation for stretching and sealing the flexible sheet against one of the outmost trusses is illustrated therein. In this variant installation, a rope 300 is threaded into a hem 302 along the lateral margin of the flexible sheet 46 and is kept taut by a puller 70 affixed to the structural angle 278, with the deflector bar 156 thereof set below the top surface of the truss 44.

On the attachment side 50 of the cover, the rope 300 is guided under a peg 304 affixed to the end plate 306 on the outmost truss. The peg 304 is substantially a same distance from the upper segment of the truss 44 as is the deflector bar 156 on the puller 70. The rope 300 is anchored to the structural angle 278 on the attachment side 50 of the cover.

The rope is pulled tight by the puller 70, to retain the hem 302 at a radius which is smaller than the radius of the upper segment of the truss 44, whereby the hem 302 is effectively retained against movement across the truss 44.

In this variant installation, one or more clips 308 are affixed to the end plate 306 along the arched segment defined by the hem 302, and the rope 300 is inserted under each clip 308. It has been found a few clips along the rope are very effective in preventing any slippage of the flexible sheet 46 over the outmost truss 44, and for enhancing the safety of workers who may have to walk over the cover.

Referring particularly to FIG. 20, the clamp bar 290 on the attachment side 50 of the cover may be replaced by a structural angle 310 to obtain substantially the same function, while providing an additional kick plate along the cover.

Figure 22:
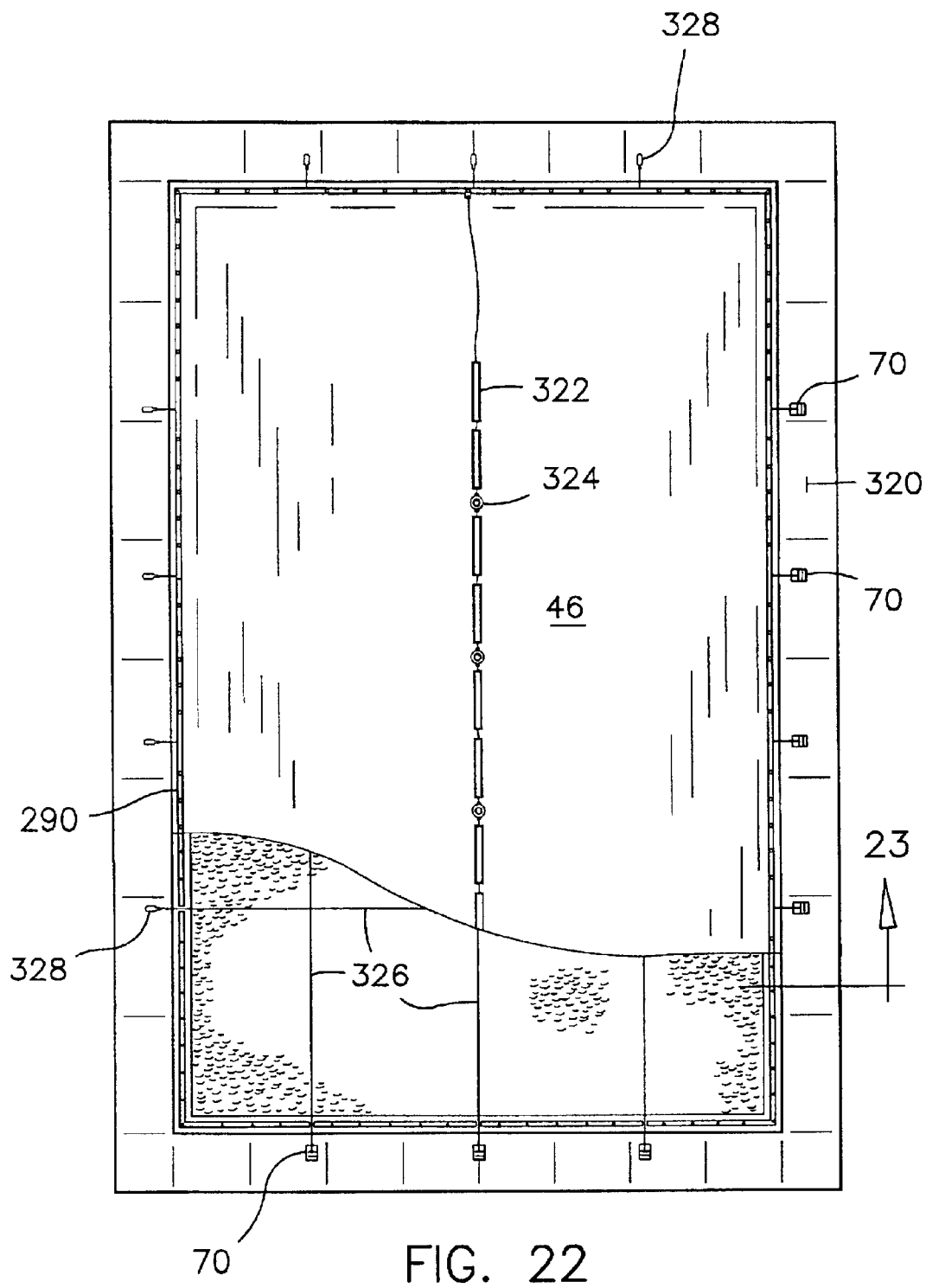
FIG. 22 is a plan view of a suspended clarifier cover comprising some of the novel elements used in the clarifier cover according to the preferred embodiment of the present invention.
Figure 23:
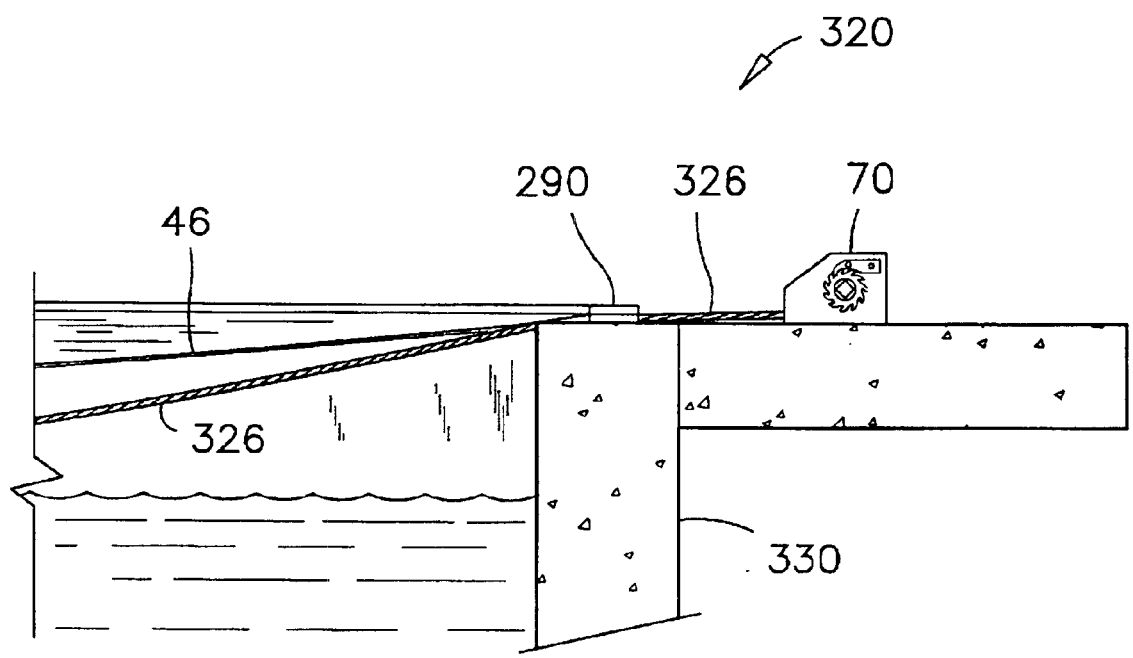
FIG. 23 is a cross-section view of the suspended cover as seen along line 23 in FIG. 22.

In FIGS. 22 and 23, there is illustrated a suspended rectangular cover comprising a sheet of gas-impermeable, flexible, high strength fabric such as the aforesaid flexible sheet 46 which is stretched across and affixed to all four sides of a reservoir 320 using clamp bars 290 as previously described herein. This type of cover is more economical and versatile than those already described. These covers are typically used to capture odorous vapours from the reservoir contents, to block sunlight thus reducing algae growth or chlorine loss, to protect against debris, and to reduce heat loss in the reservoir contents. In this type of installation, there is no truss or other cross member to support inwardly-directed reaction loads on the walls of the reservoir. The walls of these reservoirs are susceptible of being damaged by inwardly-directed point loadings.

In the suspended cover described herein, however, the flexible sheet 46 may be floating at the surface of the reservoir or suspended loosely from its edges. The flexible sheet is not tensioned across the reservoir opening like a trampoline. It is designed to deflect or sag loosely in the middle. This deflection allows the cover to support snow loads while keeping the fabric tension within safe working limits of the material. One or more weight lines 322 are mounted over the cover to cause one or more depressions in the cover surface to collect rainwater or melting snow. One or more drain holes 324 extend through the flexible sheet 46, along the weight lines to automatically evacuate rain and snow-melt water from the surface of the cover into the reservoir.

The weight line 322 also tensions the flexible sheet 46 to reduce wind flutter and to prolong the life of the cover fabric. The weight line 322 is secured in its position on the cover by ropes or straps which are tied to anchors at the cover perimeter. The weight line 322 can be removed and reinstalled by operators without standing on the cover.

An array of cables 326 is mounted under the flexible sheet 46. Each cable has one end affixed to an anchor 328 on one side or one end of the reservoir 320 and the other end is mounted in a puller 70 or winch on the other side or the other end of the reservoir. The winches 70 allow operators to vary the cables' lengths and tensions. In normal use, the cables 326 are set to sag loosely below the flexible sheet 46 as illustrated in FIG. 23, such that the cover is not supported on the cables. When the cover needs to be opened, the cables 326 are pulled tight to support the flexible sheet 46. The flexible sheet 46 can then be released from its clamp bars 290 and can be partially rolled up from one side or from one end of the reservoir. The array of cables 326 is also pulled tight to install a new flexible sheet 46 in a new installation, or to replaced an aging cover.

As soon as the flexible sheet is clamped down to the walls 330 of the reservoir, the cables 326 are lengthened and left to hang loosely under the flexible sheet. The major advantage of this installation is that in normal conditions, the cables do not apply point loading or concentrated side load on the walls of the reservoir which could eventually lead to damage to these walls. The loads applied to the walls of the reservoir by the flexible sheet are evenly distributed and therefore not detrimental to the structural integrity of the reservoir.

Although the above description refers to industrial clarifier installations, it will be appreciated that the principles of the present invention can be applied to other water and wastewater reservoirs and tanks such as: chlorine contact basins; raw water storage tanks; reclaimed water storage tanks, sand filters, aeration basins; digesters; trickling filters; sludge thickeners; equalization basins; etc. It will also be appreciated that the feature of one embodiment may be used in another.

In view of the above, it will be appreciated that many changes and modifications may be made to the illustrated and described embodiments without departing from the essence of this invention. Therefore, the above description and illustrations should not be construed as limiting the scope of the invention which is defined by the appended claims.

I claim:

1. In combination, a clarifier and a clarifier cover mounted over said clarifier for retaining off-gases inside said clarifier; said clarifier having an upper opening defined by edges comprising a first and second opposite edges; said clarifier cover comprising:

a plurality of trusses extending across said opening between said first and second opposite edges;

a flexible sheet laid over said trusses and having a first and second opposite margins;

means for retaining and sealing said first margin to said first edge;

means for pulling and releasably sealing said second margin to said second edge, comprising winch means affixed to said second edge.

2. The combination as claimed in claim 1, wherein said opening is a polygonal opening.

3. The combination as claimed in claim 1, further comprising a walkway along said second edge.

4. The combination as claimed in claim 3, wherein said winch means is mounted to said walkway.

5. The combination as claimed in claim 4, further comprising a kick plate along said walkway.

6. The combination as claimed in claim 5, wherein said winch means comprises a puller mounted to said kick plate.

7. The combination as claimed in claim 1, wherein said trusses comprises a pair of outmost trusses and said flexible sheet has a pair of lateral margins joining said first and second margins, and said clarifier cover further comprises means for pulling and releasably sealing said lateral margins to said outmost trusses.

8. The combination as claimed in claim 7, wherein said means for pulling and releasably sealing said lateral margins to said outmost trusses comprises lateral hems along said lateral margins, a rope extending in each of said hems, and winch means mounted to said outmost trusses for tightening said ropes.

9. The combination as claimed in claim 8, wherein each of said outmost trusses has an arched shape and each of said rope defines an arc having a radius smaller than a radius of said arched shape.

10. The combination as claimed in claim 9, wherein each of said outmost trusses has a plurality of clips there along engaging said rope.

11. The combination as claimed in claim 1, further comprising means for rolling said flexible sheet on said trusses from said second margin.

12. In combination, a clarifier and a clarifier cover mounted over said clarifier for retaining off-gases inside said clarifier; said clarifier having an upper opening defined by edges comprising a first and second opposite edges; said clarifier cover comprising;

a plurality of trusses extending across said opening between said first and second opposite edges;

a flexible sheet laid over said trusses and having a first and second opposite margins;

means for retaining and sealing said first margin to said first edge;

means for pulling and releasably sealing said second margin to said second edge, comprising a hem along said second margin, a pipe in said hem and a plurality of hooks engaged with said pipe, each of said hooks being movably mounted to a treaded stem anchored to said second edge.

13. The combination as claimed in claim 12, wherein said means for pulling and releasably sealing said second margin to said second edge comprises a kick plate affixed to said trusses.

14. The combination as claimed in claim 13, wherein said kick plate is an S-shaped plate having a lower curved lip sealed against said second edge and an upper curved lip in contact with said second margin.

15. A clarifier cover for retaining off-gases inside a clarifier having a first and second opposite edges, comprising;
- a plurality of spaced-apart trusses mounted across said first and second opposite edges; said trusses comprising first and second outmost trusses each having an arched plated structure attached thereto;
- a flexible sheet laid over said spaced-apart trusses; said flexible sheet having first and second longitudinal margins and first and second lateral margins;
- means for retaining and sealing said first longitudinal margin to said first edge;
- means for pulling and releasably sealing said second longitudinal margin to said second edge; and
- means for pulling said flexible sheet across said trusses and for releasably sealing said first and second lateral margins to said first and second outmost trusses respectively;
- whereby said first and second edges, said first and second outmost trusses and said flexible sheet are usable for containing off-gases inside a clarifier, and said flexible sheet is selectively movable over said trusses for accessing equipment inside said clarifier.

16. The clarifier cover as claimed in claim 15 wherein said means for pulling said flexible sheet across said trusses and for releasably sealing said first and second lateral margins to said first and second outmost trusses respectively comprises lateral hems along said lateral margins, a rope extending in each of said hems, and winch means mounted to said outmost trusses for tightening said ropes.

17. The combination as claimed in claim 16, wherein each of said rope defines an arc having a radius smaller than a radius of said arched plated structure.

* * * * *